US012725875B2

(12) United States Patent
Homann et al.

(10) Patent No.: US 12,725,875 B2
(45) Date of Patent: Sep. 1, 2026

(54) BATTERY MODULE

(71) Applicant: Robert Bosch GmbH, Stuttgart (DE)

(72) Inventors: Jerome Homann, Renningen (DE); Markus Schmitt, Tamm (DE)

(73) Assignee: Robert Bosch GmbH, Stuttgart (DE)

(*) Notice: Subject to any disclaimer, the term of this patent is extended or adjusted under 35 U.S.C. 154(b) by 679 days.

(21) Appl. No.: 18/168,061

(22) Filed: Feb. 13, 2023

(65) Prior Publication Data

US 2023/0261295 A1 Aug. 17, 2023

(30) Foreign Application Priority Data

Feb. 11, 2022 (DE) ......................... 102022201456.1

(51) Int. Cl.

| | |
|---|---|
| ***H01M 50/262*** | (2021.01) |
| ***H01M 50/224*** | (2021.01) |
| ***H01M 50/24*** | (2021.01) |
| ***H01M 50/276*** | (2021.01) |

(52) U.S. Cl.

CPC ....... *H01M 50/262* (2021.01); *H01M 50/224* (2021.01); *H01M 50/24* (2021.01); *H01M 50/276* (2021.01)

(58) Field of Classification Search

CPC .. H01M 50/262; H01M 50/224; H01M 50/24; H01M 50/276

See application file for complete search history.

(56) References Cited

U.S. PATENT DOCUMENTS

| | | | | |
|---|---|---|---|---|
| 2014/0106211 A1* | 4/2014 | Lee | H01M 50/262 | 429/185 |
| 2018/0083243 A1* | 3/2018 | Brausse | H01M 50/262 | |
| 2022/0285767 A1* | 9/2022 | Kim | H01M 50/224 | |

FOREIGN PATENT DOCUMENTS

| | | |
|---|---|---|
| DE | 102019101402 A1 | 5/2020 |
| DE | 102019103049 A1 | 8/2020 |
| DE | 102019210790 A1 | 1/2021 |
| DE | 102019131152 A1 | 5/2021 |
| DE | 102019220034 A1 | 6/2021 |

OTHER PUBLICATIONS

Machine translation of DE102019131152A1 (cited on IDS) (Year: 2021).*

* cited by examiner

*Primary Examiner* — Eugenia Wang

(74) *Attorney, Agent, or Firm* — Michael Best & Friedrich LLP

(57) ABSTRACT

The invention relates to a battery module comprising a housing element (2) made of a metal material (3) and a cover element (4) made of a metal material (5), which elements are connected to one another by means of a plurality of screw connections (8), so as to form a common interior (6) designed to receive a plurality of battery cells (7), in such a way that an electrical contact is formed between the housing element (2) and the cover element (4), wherein a sealing element (9) is also arranged between the housing element (2) and the cover element (4) in such a way that the interior (6) is sealed off in a fluid-tight manner from an environment (10), wherein the plurality of screw connections (8) is arranged outside of the sealing element (9).

14 Claims, 3 Drawing Sheets

BATTERY MODULE

BACKGROUND OF THE INVENTION

The invention proceeds from a battery module comprising a housing element made of a metal material, in particular aluminum, and a cover element made of a metal material, in particular aluminum, which elements are connected to one another by means of a plurality of screw connections, so as to form a common interior designed for receiving a plurality of battery cells, in such a way that an electrical contact is formed between the housing element and the cover element, wherein a sealing element is also arranged between the housing element and the cover element in such a way that the interior is sealed off in a fluid-tight manner from an environment.

A battery module comprises a plurality of individual battery cells, each having a positive voltage tap and a negative voltage tap, wherein the respective voltage taps are electrically conductively connected to one another for an electrically conductive series and/or parallel connection of the plurality of battery cells to one another and can thus be interconnected to form the battery module. In particular, the battery cells can each have a first voltage tap, in particular a positive voltage tap, and a second voltage tap, in particular a negative voltage tap, which are electrically conductively connected to one another by means of cell connectors, such that an electrical series and/or parallel connection is formed.

Battery modules in turn are furthermore interconnected to form batteries or entire battery systems.

For example, DE 10 2019 220 034, DE 10 2019 210 790, DE 10 2019 103 049 or DE 10 2019 131 152 constitute prior art.

DE 10 2019 220 034, for example, describes a battery housing having a cover and a seal, which seals off the interior of the battery in a watertight and/or gas-tight manner from the environment. For protection against penetrating moisture, a filling material is introduced into the gap adjacent to the seal, wherein the filling material has a permanently pasty consistency.

DE 10 2019 210 790 discloses a battery housing having a peripheral sealing flange and a housing cover, which has a peripherally extending seal which seals a contact edge formed between the components. A zero gap between the housing and the cover is formed on the outside, radially to the seal, wherein a liquid seal is introduced into the zero gap.

DE 10 2019 103 049 describes a battery housing having a first housing part, a second housing part having a contact layer in between, which comprises an electrically conductive and resilient material.

DE 10 2019 131 152 describes a battery housing having a receiving body, a cover and having a sealing element in between. In this case, the cover has a deflector part for conducting environmental influences away from the sealing gap.

SUMMARY OF THE INVENTION

A battery module according to the invention offers the advantage that a reliable design of an electrically conductive connection between a housing element of the battery module and a cover element of the battery module can be formed and, furthermore, an interior of the battery module can be reliably sealed off from an environment at the same time.

For this purpose, a battery module is provided according to the invention having a housing element, which is made of a metal material, in particular aluminum, and having a cover element, which is made of a metal material, in particular aluminum. In this case, the housing element and the cover element are connected to one another, forming a common interior. The interior is designed to receive a plurality of battery cells. A plurality of battery cells is preferably received in the interior. Furthermore, the housing element and the cover element are connected to one another by means of a plurality of screw connections, in such a way that an electrical contact is formed between the housing element and the cover element. As a result, an electromagnetically compatible connection is formed between the housing element and the cover element. Furthermore, a sealing element is arranged between the housing element and the cover element in such a way that the interior is sealed off in a fluid-tight manner from an environment. According to the invention, the plurality of screw connections is arranged outside of the sealing element.

Advantageous developments and improvements of the device are made possible by the measures set out in the dependent claims.

First, it should be noted at this point that an arrangement of the screw connection outside of the sealing element is understood in particular to mean that the screw connections do not pass through or contact the sealing element, in particular its sealing material, but are arranged spaced apart therefrom. As a result, the screw connections are in particular not arranged in the region designed for sealing. The screw connections are therefore arranged between the environment and the sealing element. This can ensure that no sealing material is located on or in a screw connection, which could have an undefined influence on the formation of the screw connection and thus the screw parameters.

In this regard, it should also be noted at this point that the screw connection establishes an electrical contact between the housing element and the cover element, in particular since the screw connection mechanically and electrically contacts both the housing element and the cover element. In particular, the screw connections are formed at defined locations and at a defined spacing from one another. Thus, a connection with electromagnetic compatibility (or EMC) can be formed between the housing element and the cover element.

It is expedient if individual screw connections are arranged spaced apart from one another and/or a first sealing surface of the housing element and a second sealing surface of the cover element are arranged spaced apart from one another in such a way as to form an electromagnetic shielding of the interior from the environment. At this point, it should be noted in this respect that, in order to form an electromagnetic shielding of the interior of the battery module from the environment, a certain spacing between the individual screw connections and also a certain spacing between the first sealing surface and the second sealing surface must be maintained.

It is advantageous if the screw connections each comprise a screw means receptacle, in which a screw means is received in each case. In this case, the housing element or the cover element forms a respective screw means receptacle. Furthermore, a bearing surface of the screw means receptacle is directly connected to a first contact surface of the housing element or a second contact surface of the cover element. This makes it possible for a sufficient surface pressure to be formed between the housing element and the cover element, such that a penetration of condensate into the sealing gap formed can be avoided. In particular, a hard stop between, for example, the cover element and a head of a screw means can advantageously also be formed as a result.

In particular, what is referred to as a hard joint having metal contact surfaces is thus formed.

Particularly preferably, the screw means receptacles are each designed as screw domes. In this case, the screw domes can in particular be geometrically formed in such a way that their contact surfaces are minimized against corrosion. Furthermore, the screw domes can be designed in such a way that stress peaks which may occur in the case of a sealing adhesive bond, for example, can be minimized or avoided. In this case, the contour towards the sealing surface is preferably designed as a continuous line in order to minimize stress concentrations of the sealing adhesive bond in the region of the screw domes.

Expediently, a bearing surface of a screw means receptacle, in particular a screw dome, is raised relative to a first sealing surface of the housing element or a second sealing surface of the cover element. In particular, a spacing between the first sealing surface of the housing element and the second sealing surface of the cover element can thus be adjustable. In other words, the spacing between the housing element and the cover element can be adjusted by the individual bearing surfaces. As a result, for example, on the one hand the height of the sealing element can be set to a specific level, and on the other hand the spacing between the sealing surface and the screw dome can be adjusted to a level that is permissible for electromagnetic shielding. The height of this gap determines the spacing of the individual screw connections.

Such an increase in height additionally offers the advantage that the sealing surface is not contaminated in the assembly line, since the screw means receptacle or the screw domes can be used as bearing surfaces. This is particularly advantageous for structural adhesive of such a secure sealing adhesive bond.

Preferably, the housing element is designed as an aluminum die-cast housing.

Furthermore, the cover element is preferably designed as a deep-drawn part made from an aluminum alloy.

In addition, it is preferred if the sealing element is designed as an adhesive. In particular, a structural adhesive is preferred.

It should also be noted at this point that positioning of the cover element can be ensured by the screw connection until the adhesive has hardened. Preferably, the adhesive is applied to the first sealing surface of the housing element during assembly.

In order to manufacture a battery module, a defined quantity of the material of the sealing element is applied to the sealing geometry in particular before the screw connection is formed, such that the spacing between the housing element and the cover element is completely filled and any possible corrosive infiltration of the seal is minimized.

BRIEF DESCRIPTION OF THE DRAWINGS

Embodiments of the invention are illustrated in the drawings and explained in more detail in the following description.

DETAILED DESCRIPTION

Figure 1:
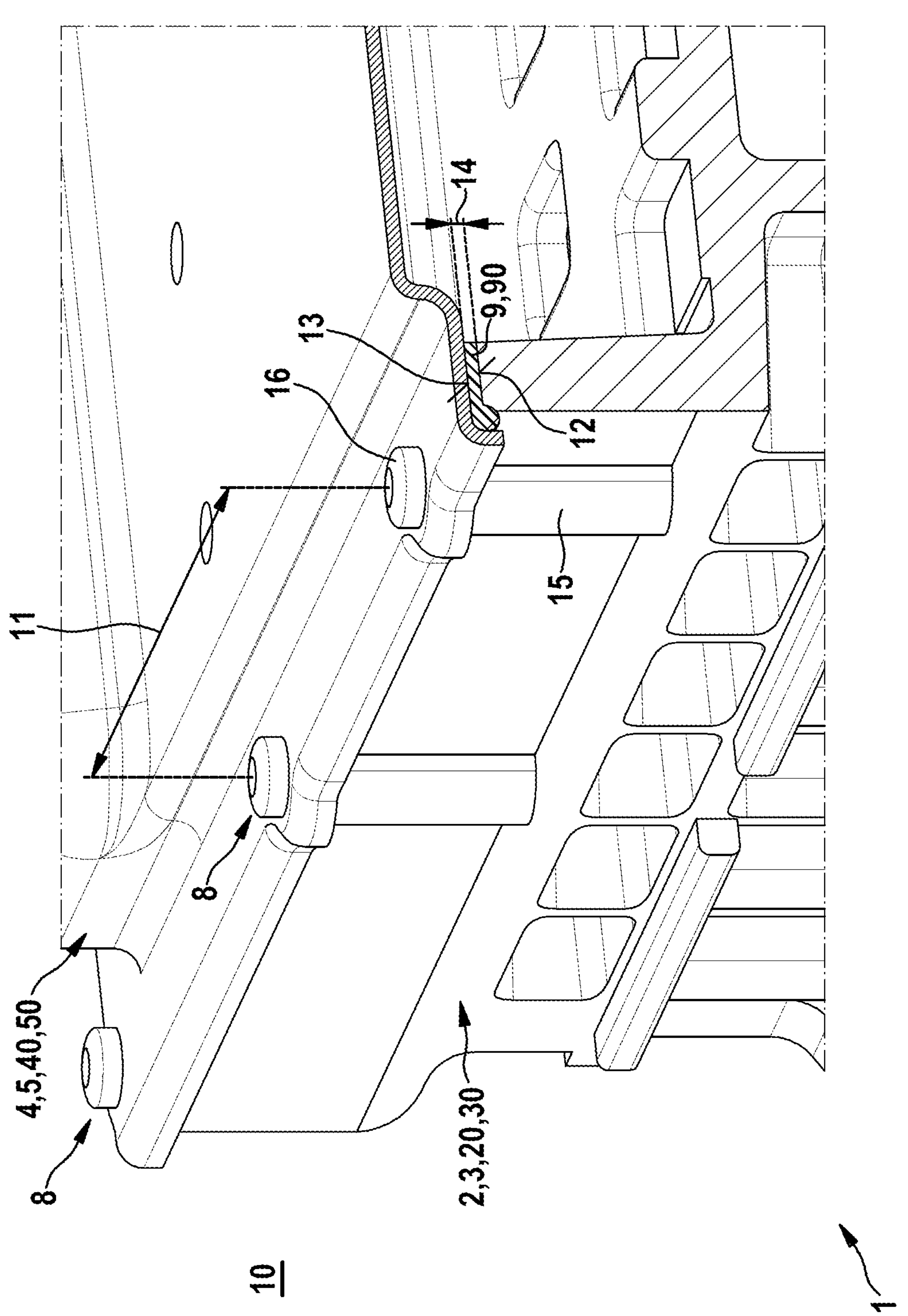
FIG. 1 is a perspective view of a section of a battery module according to the invention.

The battery module 1 comprises a housing element 2 which is made of a metal material 3, in particular aluminum 30. The housing element 2 is in particular designed as an aluminum die-cast housing 20.

The battery module 1 comprises a cover element 4 which is made of a metal material 5, in particular aluminum 50. The cover element 4 is in particular designed as a deep-drawn part 40 made of an aluminum alloy.

The housing element 2 and the cover element 4 are connected to one another, forming a common interior 6 (not visible in FIG. 1) which is designed to receive a plurality of battery cells 7. In this case, the plurality of battery cells 7, which is received in the interior 6, is likewise not visible in FIG. 1.

In this case, the housing element 2 and the cover element 4 are connected to one another by means of a plurality of screw connections 8. The connection is designed in such a way that an electrical contact is formed between the housing element 2 and the cover element 4. The screw connections 8 each comprise a screw means receptacle 15, in each of which a screw means 16 is received.

In this case, for example, the housing element 2 or the cover element 4 can form the respective screw means receptacle 15. In the embodiment shown in FIG. 1, the housing element 2 forms the screw means receptacles 15, for example.

Furthermore, individual screw connections 8 are arranged spaced apart from one another in such a way that an electromagnetic shielding of the interior 6 from the environment 10 is formed. In particular, a spacing 11 between two screw connections 8 is selected such that an electromagnetic shielding of the interior 6 from the environment 10 is ensured.

Furthermore, a sealing element 9 is arranged between the housing element 2 and the cover element 4. The sealing element 9 is arranged in such a way that the interior 6 is sealed off in a fluid-tight manner from the environment 10. The sealing element 9 is in particular designed as an adhesive 90.

Furthermore, a first sealing surface 12 of the housing element 2 and a second sealing surface 13 of the cover element 4 are arranged spaced apart from one another in such a way that an electromagnetic shielding of the interior 6 from the environment 10 is formed. In particular, a spacing 14 between the first sealing surface 12 and the second sealing surface 13 is selected such that an electromagnetic shielding of the interior 6 from the environment 10 is ensured.

In this case, the plurality of screw connections 8 is arranged outside of the sealing element 9.

Figure 2:
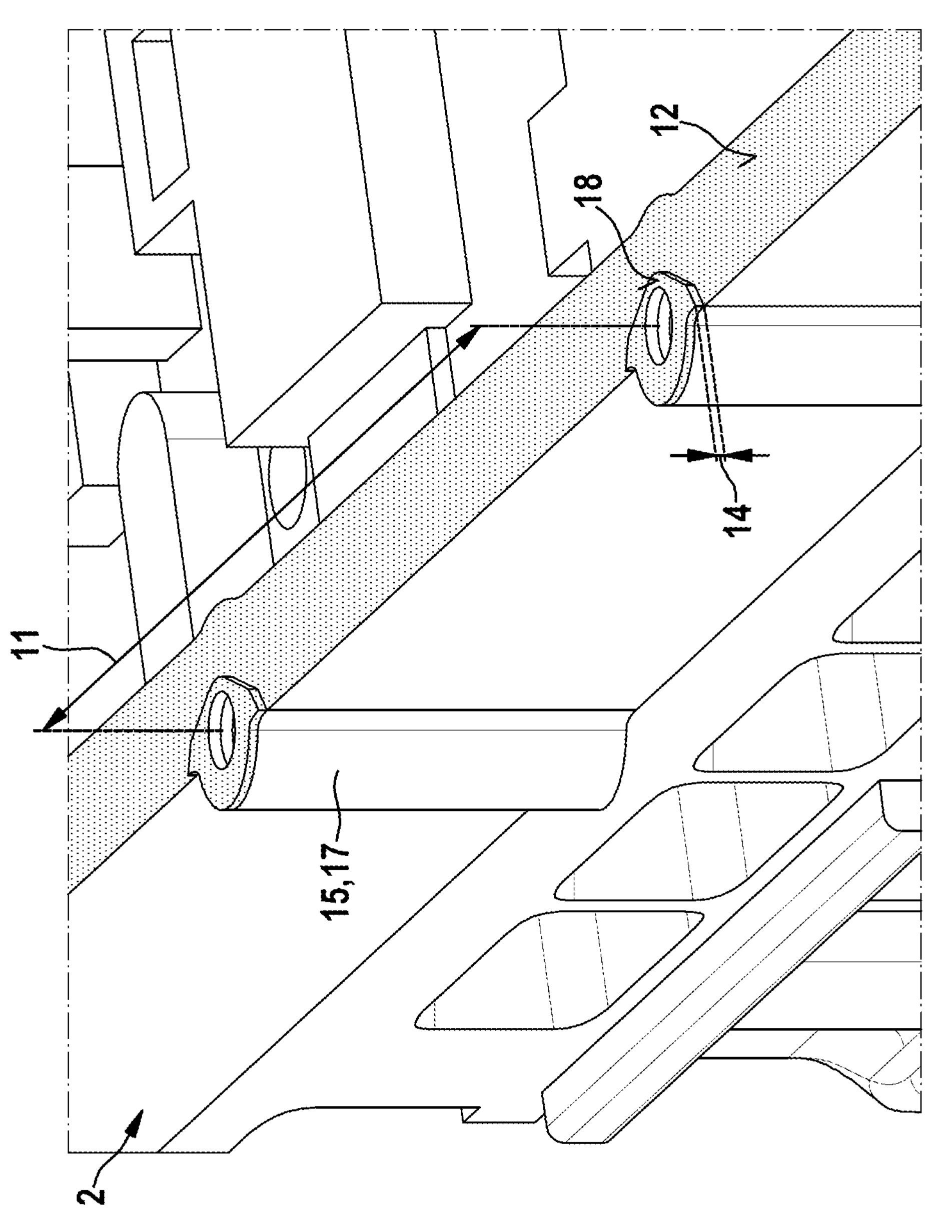
FIG. 2 is a perspective view of a section of a housing element of a battery module according to the invention.

FIG. 2 is a perspective view of a section of a housing element 2 of a battery module 1 according to the invention.

In particular, it can be seen in FIG. 2 that the screw means receptacles 15 are each designed as screw domes 17.

The screw means receptacle 15 of the housing element 2 or the screw dome 17 of the housing element 2 has a bearing surface 18. This bearing surface 18 is designed to be directly connected to a second contact surface 19 of the cover element 4. Should the screw means receptacle 15 or the screw dome 17 be arranged on the cover element 4, the bearing surface 18 would be designed to be directly connected to a first contact surface 20 of the housing element 2.

The bearing surface 18 of the screw means receptacle 15, in particular of the screw dome 17, is raised relative to the first sealing surface 12 of the housing element 2. In particular, a spacing 14 between the first sealing surface 12 of the housing element 2 and the second sealing surface 13 of the cover element 4 is thereby adjustable.

Figure 3:
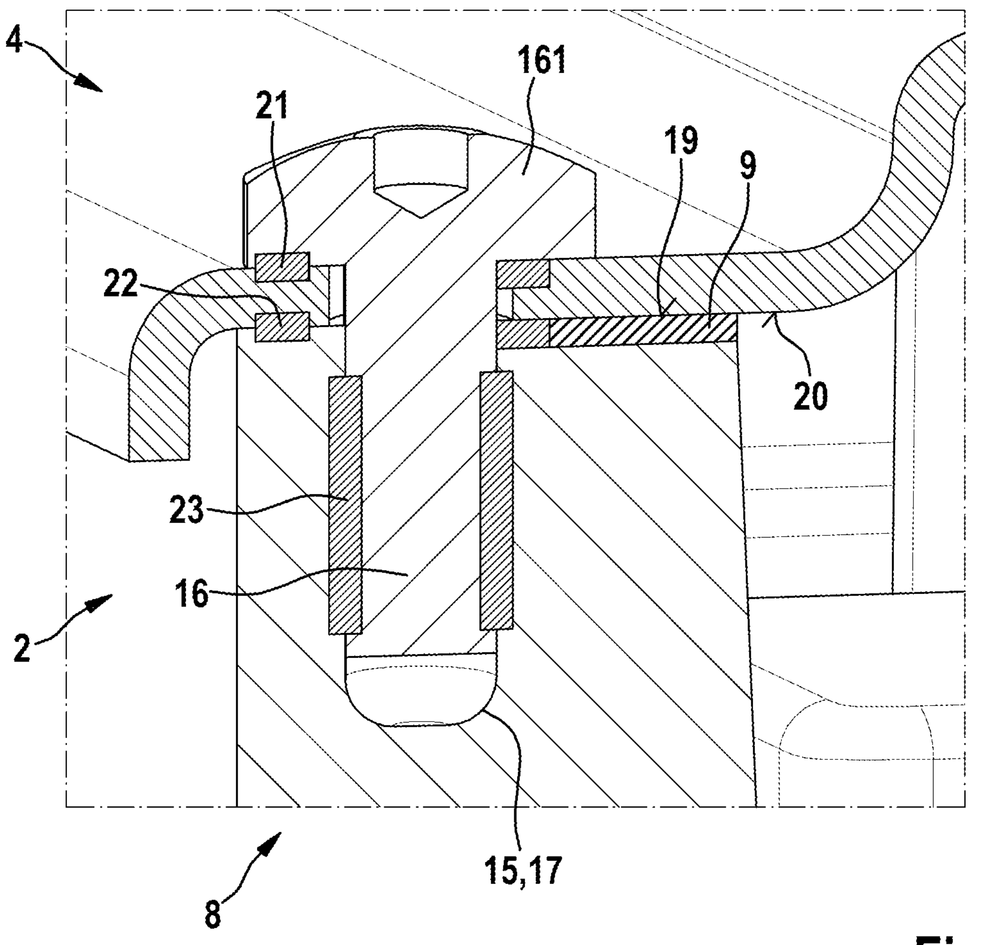
FIG. 3 is a sectional view of a screw connection of a battery module according to the invention.

It can be seen here that the shape of the screw dome 17 allows the sealing element 9 to be kept away from the screw connection 8. In this case, the bearing surface 18 is designed to be just large enough that the region under a head 161, described in FIG. 3, is minimized, but the permissible surface pressure is nevertheless not exceeded. This has the advantage that the contact surface for corrosive infiltration in the region in front of the screw connection 8 is minimized by the surface pressure.

FIG. 2 also shows the first sealing surface 12 of the housing element 2.

Furthermore, the spacing 11 between two screw connections 8 is shown.

In addition, the resulting spacing 14 between the first sealing surface 12 and the second sealing surface 13 can be seen. In particular, this spacing 14 corresponds to the increase in height of the bearing surface 18 of the screw means receptacle 15 or the screw dome 17.

FIG. 3 is a sectional view of a screw connection 8. In particular, a sectional view through the screw connection 8 between the housing element 2 and the cover element 4 is shown.

First of all, the housing element 2 and the cover element 4 can be seen. Furthermore, the sealing element 9 can also be seen.

The screw connection 8 comprises a screw means receptacle 15, which is designed in particular as a screw dome 17 and in which a screw means 16 is received.

As a result, a first direct contact 21, in particular a metal contact, is formed between a head 161 of the screw means 16 and the cover element 4.

Furthermore, a second direct contact 22, in particular a metal contact, is thereby formed between the housing cover 4 and the screw means receptacle 15 of the housing element 2 or the screw dome 17 of the housing element 2.

Furthermore, a third direct contact 23, in particular a metal contact, is thereby formed between the screw means receptacle 15 of the housing element 2 or the screw dome 17 of the housing element 2, and the screw means 16.

By means of the first direct contact 21, the second direct contact 22 and the third direct contact 23, an electrical contact for an electromagnetically compatible connection between the housing element 2 and the cover element 4 can be formed overall.

In particular, a hard joint is formed by the metal contacts. In this case, no material of the sealing element 9 is arranged in the screw region, which could lead to an interference of the EMC connection or to a setting of the screw connection 8.

The embodiment of the bearing surface 18 of the screw domes 17 is preferably geometrically designed such that no stress peaks arise for the sealing adhesive bond. The contour towards the sealing surface is designed as a continuous line in order to minimize stress concentrations of the sealing adhesive bond in the region of the screw domes 17. In this case, the outer contour of the screw domes 17 is geometrically designed such that the width of the permissible gap in combination with the height of the permissible gap meets the EMC requirements.

The invention claimed is:

1. A battery module comprising a housing element (2) made of a metal material (3) having a first uppermost sealing surface (12), the first uppermost sealing surface (12) being planar and extending around a periphery of the housing element (2), and a cover element (4) made of a metal material (5) having a second sealing surface (13), the second sealing surface (13) being planar, wherein the housing and cover elements are connected to one another by a plurality of screw connections (8), so as to form a common interior (6) configured for receiving a plurality of battery cells (7), in such a way that an electrical contact is formed between the housing element (2) and the cover element (4), wherein a sealing element (9) is sandwiched between the first uppermost sealing surface (12) of the housing element (2) and the second sealing surface (13) of the cover element (4) in such a way that the interior (6) is sealed off in a fluid-tight manner from an environment (10), wherein the sealing element (9) covers an entirety of the first uppermost sealing surface (12), wherein the plurality of screw connections (8) is arranged outside the sealing element (9), wherein the screw connections (8) each comprise a screw receptacle (15), in each of which a screw (16) is received, wherein the housing element (2) forms the respective screw receptacles (15), wherein a bearing surface (18) of each screw receptacle (15) is directly connected to a contact surface (20) of the cover element (4) when the electrical contact is formed, and wherein the bearing surface (18) of each screw receptacle (15) is raised relative to the first uppermost sealing surface (12) of the housing element (2).

2. The battery module according to claim 1, wherein individual screw connections (8) of the plurality of screw connections (8) are arranged spaced apart from one another, and/or wherein the first uppermost sealing surface (12) of the housing element (2) and the second sealing surface (13) of the cover element (4) are arranged spaced apart from one another, in such a way that an electromagnetic shielding of the interior (6) from the environment (10) is formed.

3. The battery module according to claim 1, wherein the screw receptacles (15) are screw domes (17).

4. The battery module according to claim 3, wherein the bearing surface (18) of one of the screw domes (17) is raised relative to the first uppermost sealing surface (12) of the housing element (2), such that a spacing (14) between the first uppermost sealing surface (12) of the housing element (2) and the second sealing surface (13) of the cover element (4) is adjustable.

5. The battery module according to claim 1, wherein the housing element (2) is an aluminum die-cast housing (20).

6. The battery module according to claim 1, wherein the cover element (4) is a deep-drawn part (4) made of an aluminum alloy.

7. The battery module according to claim 1, wherein the sealing element (9) is an adhesive (90).

8. A battery module comprising a housing element (2) made of aluminum (30) having a first uppermost sealing surface (12), the first uppermost sealing surface (12) being planar and extending around a periphery of the housing element (2), and a cover element (4) made of aluminum (50) having a second sealing surface (13), the second sealing surface (13) being planar, wherein the housing and cover elements are connected to one another by a plurality of screw connections (8), so as to form a common interior (6) configured for receiving a plurality of battery cells (7), in such a way that an electrical contact is formed between the housing element (2) and the cover element (4), wherein a sealing element (9) is sandwiched between the first uppermost sealing surface (12) of the housing element (2) and the second sealing surface (13) of the cover element (4) in such a way that the interior (6) is sealed off in a fluid-tight manner from an environment (10), wherein the sealing element (9) covers an entirety of the first uppermost sealing surface (12), wherein the plurality of screw connections (8) is arranged outside the sealing element (9), wherein the screw connections (8) each comprise a screw receptacle (15), in each of which a screw (16) is received, wherein the housing element (2) forms the respective screw receptacles (15), wherein a bearing surface (18) of each screw receptacle (15) is directly connected to a contact surface (20) of the cover element (4) when the electrical contact is formed, and wherein the bearing surface (18) of each screw receptacle (15) is raised relative to the first uppermost sealing surface (12) of the housing element (2).

9. The battery module according to claim 8, wherein individual screw connections (8) of the plurality of screw connections (8) are arranged spaced apart from one another, and/or the first uppermost sealing surface (12) of the housing element (2) and the second sealing surface (13) of the cover element (4) are arranged spaced apart from one another, in such a way that an electromagnetic shielding of the interior (6) from the environment (10) is formed.

10. The battery module according to claim 9, wherein the screw receptacles (15) are each designed as screw domes (17).

11. The battery module according to claim 10, wherein the bearing surface (18) of one of the screw domes (17) is raised relative to the first uppermost sealing surface (12) of the housing element (2) such that a spacing (14) between the first uppermost sealing surface (12) of the housing element (2) and the second sealing surface (13) of the cover element (4) is adjustable.

12. The battery module according to claim 11, wherein the housing element (2) is designed as an aluminum die-cast housing (20).

13. The battery module according to claim 12, wherein the cover element (4) is a deep-drawn part (4) made of an aluminum alloy.

14. The battery module according to claim 13, wherein the sealing element (9) is an adhesive (90).

* * * * *